(No Model.)
R. C. RUDY.
BICYCLE MUD GUARD.
No. 520,245. Patented May 22, 1894.
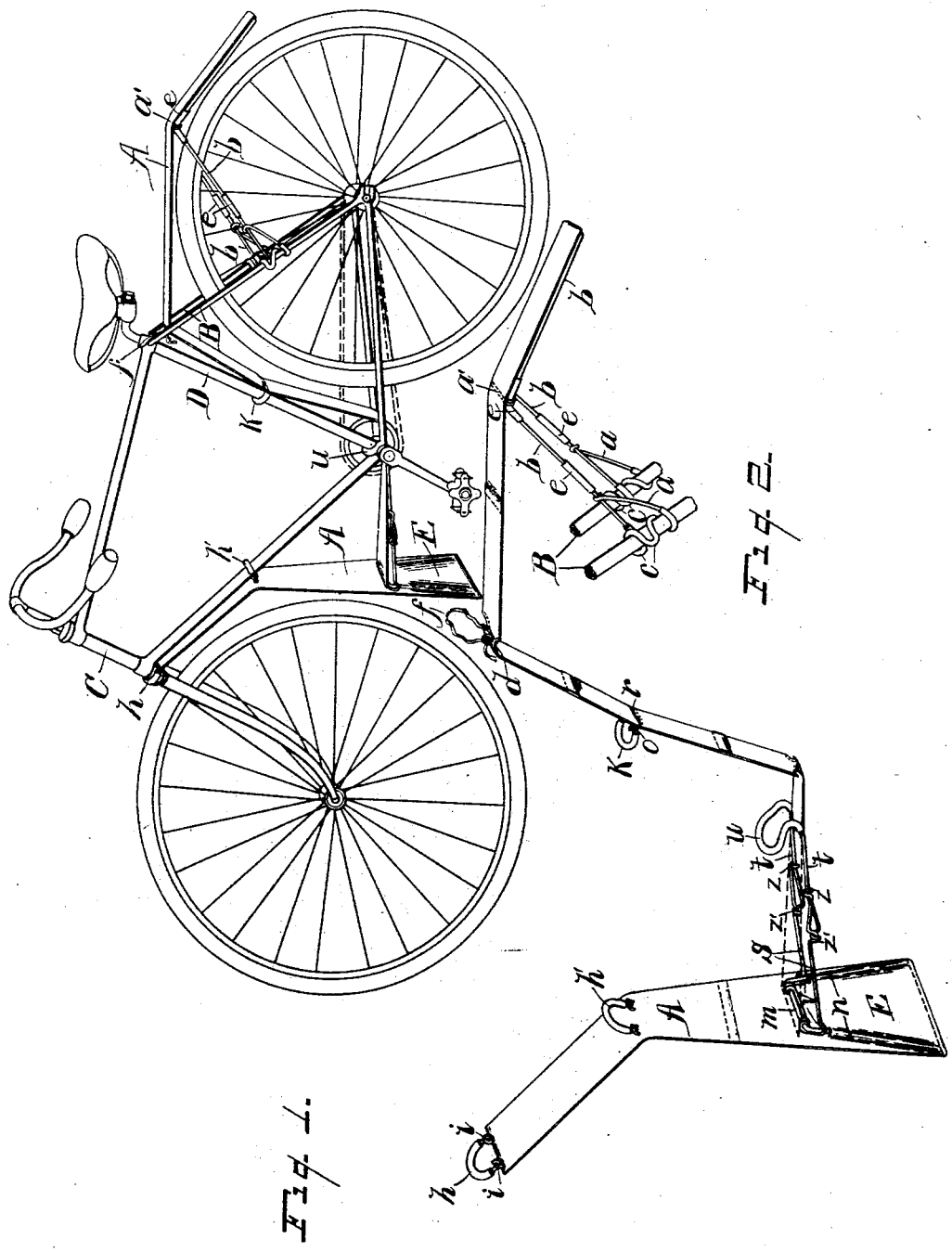
WITNESSES
INVENTOR
Robert C. Rudy
By R. B. Wheeler & Co
Attorneys.

UNITED STATES PATENT OFFICE.

ROBERT C. RUDY, OF DETROIT, MICHIGAN, ASSIGNOR, BY MESNE ASSIGNMENTS, TO THE M. E. GRISWOLD COMPANY, OF CHICAGO, ILLINOIS.

BICYCLE MUD-GUARD.

SPECIFICATION forming part of Letters Patent No. 520,245, dated May 22, 1894.

Application filed April 6, 1893. Serial No. 469,265. (No model.)

*To all whom it may concern:*

Be it known that I, ROBERT C. RUDY, a citizen of the United States, residing at Detroit, in the county of Wayne, State of Michigan, have invented certain new and useful Improvements in Bicycle Mud-Guards; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in mud guards for bicycles, and consists in the construction and arrangement of parts as fully hereinafter set forth, the essential features of which being pointed out particularly in the claims.

The object of the invention is to provide a light, simple and continuous mud-guard for bicycles which will guard both wheels, and may be readily attached to, or removed from the machine at will, and in which the arrangement is such as to enable the guard when not in use, to be folded into a small package so as to be conveniently carried, either under the saddle of the rider, or upon the frame in the manner of the ordinary tool-bag. This object is attained by the mechanism illustrated in the accompanying drawings, in which—

Figure 1 is a side view of a bicycle, showing my improved mud-guard attached thereto. Fig. 2 is an enlarged perspective of the guard, and its attaching parts removed from the machine.

Referring to the letters of reference, A designates the guard proper, which is made of flexible fabric of any suitable material, and is adapted to extend the entire length of the machine, being attached to the frame in such manner as to afford a guard for both wheels. The rear end of said guard is held extended over the rear wheel, by means of the spring rods $b$. These rods are removably attached to the rear forks B, by a series of return or sinuous bends $c$, which form a seat that receives said forks, and afford a brace for said rods, the free ends of which are coiled once around the forks and extending as at $a$ are provided at their extremities with a hook which is adapted by springing said ends upward, to engage the body portion of said rods, some distance from the forks B, and thereby firmly clamp the rods $b$ to said forks. These rods, as will be understood, extend on each side of the rear wheel to a point above the same, where they are connected by a cross bar $a'$, from which point said rods extend rearwardly at a declining angle to conform more closely to the shape of the wheel, and are connected at their rear ends by a horizontal or right-angle portion to which the rear end of the guard is attached. For convenience in packing, these rods are made in sections, which are united by means of a socket-ferrule, as shown at $e$, but it is evident, however, that said rods may be made of a continuous piece, if desired. From the rear ends of said rods, the guard extends forward over the rear wheel and between the upper ends of the rear forks. The guard being somewhat wider than the space between said forks at this point, a bifurcated spreader is employed, the ends of which receive said forks and extend the fabric of the guard to its full width on each side thereof, as clearly shown at $d$ in Fig. 2, the guard being supported between said forks by means of the loop $f$ that is adapted to be attached to said spreader, and to engage the seat-rod, as shown in Fig. 1. The force of the spring in the rods $b$ is exerted rearwardly and is sufficient to place such tension upon this portion of the guard to keep it taut. From between the rear forks, the guard extends downward in front of the rear wheel, thence under the crank-hanger and up to the steering head in the rear of the front wheel. The forward end of the guard is attached to the steering head C, by means of a loop $h$ that encircles said head and is provided with hooks at its ends that engage in eyes formed in a spreader secured in the end of said guard, as shown at $i$ in Fig. 2, said guard being held from contact with the front wheel by means of a loop $h'$ that encircles the lower rod of the frame, and is detachably coupled to a spreader in said guard, from which point said guard extends vertically downward in gradually increasing width to the end of the wing E, which depends from the guard in the rear of the front wheel and protects the feet of the rider. A like loop $k$ is employed to hold the guard away from the rear wheel where it passes downward in front of same to the crank hanger. Said loop encircles the seat-rod D, and is provided with hooks $o$, that engage corresponding eyes formed on a spreader $r$ attached to said guard. To extend the wing E and hold it in position, a wire bail $m$ is used, the ends of which are inserted in diverging pockets $n$ in said wing. Around the top of said bail are wound the ends of the arms $s$ so as to form a pivotal coupling therewith, said arms being provided with a shoulder $v$ thereon which engages the bail, and prevents it from swinging backward, and having at their outer ends the hooks $z$.

$t$ designates parallel spring arms, which are joined by an integral loop $u$ that extends at an angle to said arms. This loop is adapted to encircle the lower end of the seat rod so as to allow said arms to pass under the crank-hanger and permit their free ends to be sprung upward and extend horizontally under the guard, in which position they are retained by hooks $z'$ on the ends of said arms, engaging the arms $s$, and by the hooks $z$ on said latter arms that engage the arms $t$, clearly shown in Fig. 2. The tendency of said arms $t$ is to spring downward, and by this means, sufficient tension is applied to the guard to keep it taut throughout that portion thereof forward of the rear forks.

The attaching parts where they engage the machine, are covered with rubber, or other flexible material, to obviate marring the frame of the machine and prevent any rattling of said parts.

This improved device is very light, and when attached to the machine, forms a perfect and continuous guard for both wheels, and may be readily detached and converted into a very small package, so that when not in use on the wheel, it may be carried without any inconvenience to the rider.

I am aware that mud guards for bicycles have been constructed in which a detachable jointed frame is employed to support the rear end of the guard over the wheel. I do not therefore claim broadly a mud guard for bicycles consisting of the combination of a jointed frame removably attached to the rear fork and a band attached to said frame and to the machine, but What I do claim as new, and desire to secure by Letters Patent, is—

1. In a mud-guard for bicycles, the combination with the frame of a bicycle, of a continuous strip of flexible material attached to said frame and adapted to extend over the rear wheel, and in the rear of the front wheel, so as to form a mud-guard for said wheels and the spring arms mounted on the frame and supporting the rear end of said guards.

2. In a mud-guard for bicycles, the combination with the frame of the machine, of a flexible guard attached at one end to said frame, and extending over the rear wheel the sectional spring arms mounted on the frame and supporting the rear end of said guard, said arms being bent at an abrupt angle near their longitudinal center so as to cause said guard to conform to the shape of the wheel, and, being adapted to apply tension to said guard to keep it taut.

3. In a mud-guard for bicycles, the combination with the frame, of the continuous flexible strip attached to said frame and passing therethrough in such manner as to form a guard for both wheels, the spring arms attached to the center of the frame and adapted to extend horizontally onto that portion of said strip between the wheels and place sufficient tension thereon to keep it taut.

4. In a mud-guard for bicycles, the combination with the frame of the machine, of the continuous flexible strip attached to said frame so as to guard both wheels, the curved spring arms attached to the frame and supporting the rear end of said strip over the rear wheel, the horizontal arms attached to the frame and extending onto a portion of said strip in the rear of the front wheel so as to apply sufficient tension to said strip to keep it taut.

5. In a bicycle mud-guard, the combination with the frame of the machine, of the continuous flexible guard attached thereto and extending through said frame so as to guard both wheels thereof, the arms supporting said guard over the rear wheel the integral wing depending from said guard in the rear of the front wheel, the spring arms attached to the frame and adapted to place tension on said guard.

In testimony whereof I affix my signature in presence of two witnesses.

ROBERT C. RUDY.

Witnesses:
EDGAR S. WHEELER,
E. K. ROEMER.